J. STEYNIS.
PROCESS FOR THE PRODUCTION OF OZONE.
APPLICATION FILED SEPT. 3, 1908.
Patented Dec. 8, 1908.
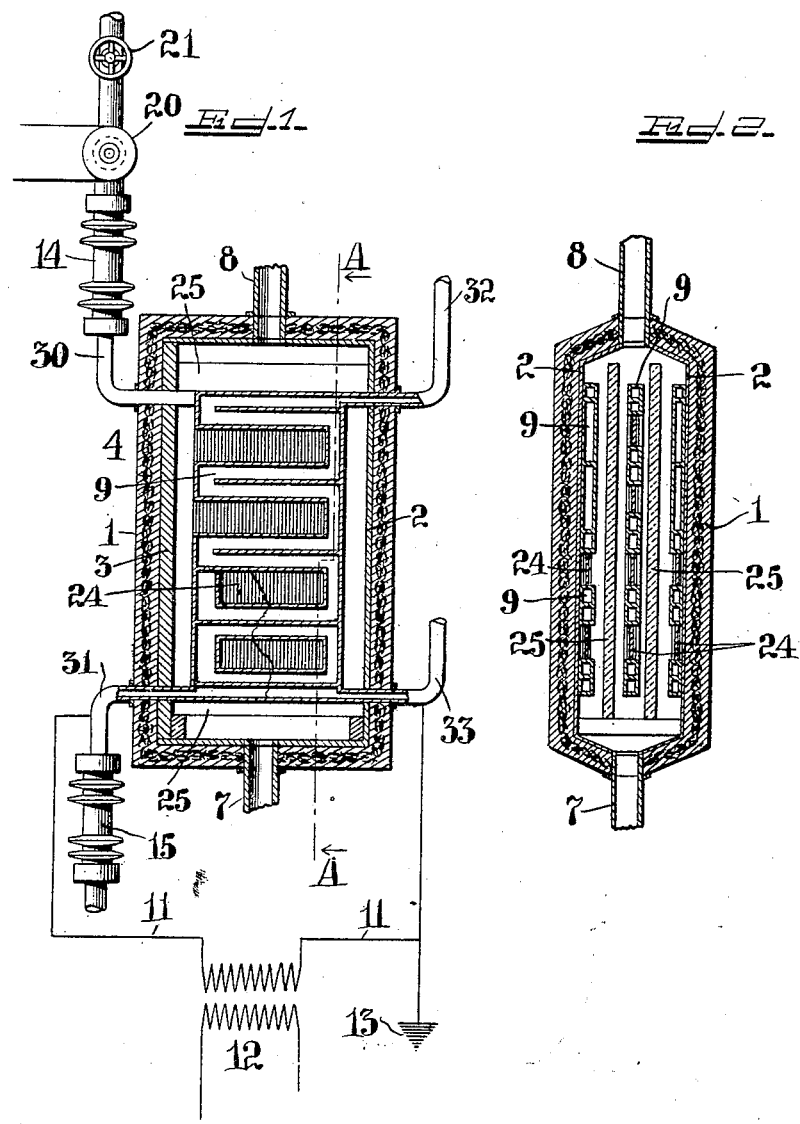
Inventor:
Jan Steynis

UNITED STATES PATENT OFFICE.

JAN STEYNIS, OF NEW YORK, N. Y.

PROCESS FOR THE PRODUCTION OF OZONE.

No. 906,468.  Specification of Letters Patent.  Patented Dec. 8, 1908.

Original application filed January 24, 1908, Serial No. 412,378. Divided and this application filed September 3, 1908. Serial No. 451,547.

*To all whom it may concern:*

Be it known that I, JAN STEYNIS, a subject of the Queen of the Netherlands, and residing in the city, county, and State of New York, have invented certain new and useful Improvements in Processes for the Production of Ozone, of which the following is a full, clear, and complete disclosure.

This application is a division of my prior application for "Apparatus for the production of ozone," Serial Number 412,378, filed January 24, 1908.

My invention resides in the process of producing ozone by employing the well known silent or streaming electrical discharges, and, in addition, maintaining the temperature of the treated gas practically constant during its passage through the ozoning chamber by following each short period of ozonizing action with a corresponding period of cooling action, so that for each increment of ozonizing effect the corresponding increment of heat will be abstracted, while the ozonizing results will be retained and the gas at no time during its progress through the chamber will be permitted to rise in temperature above the point necessary for the most efficient ozonizing action. By this I am enabled to maintain a practically perfect physical balance between the development of heat in each ozonizing step and the abstraction of heat by cooling, whereby the chemical equilibrium between the oxygen in the gas submitted to the process and the ozone thereby produced is the equilibrium corresponding to the lowest practicable temperature. In other words, I maintain the lowest temperature practicable, at which temperature the chemical equilibrium gives us the largest percentage of ozone and the lowest percentage of remaining oxygen in the submitted gas. Moreover, in addition to this process of progressively cooling the treated gas step by step during its passage through the ozonizer, it is also a part of my present invention to accomplish the cooling aforesaid by means of a liquefied gas from which the pressure is removed at the moment of use, so that it is free to revert from the liquid to the gaseous state and thereby absorb its characteristic amount of latent heat, which heat it gathers from the gas which is being ozonized and from the adjacent parts of the apparatus. This is the best means now known to me for producing the desired low temperature. Preferably I apply the cooling effect through the agency of the electrodes between which the electrical discharges take place, these electrodes being for this purpose made hollow and preferably of a sinuous form, and the cooling liquefied gas being introduced into them and there allowed to expand and produce the cooling effect above mentioned. By this means the cooling action is applied directly at the point of heating and can be effectively and instantly adjusted to secure the described balance. While I maintain the above mentioned temperature balance throughout the entire length of the ozonizer, I prefer to have at all points the same velocity and same cross-section of the column of gas under treatment, which calls for substantially the same degrees of ozonizing and cooling effects at all points of the ozonizer in order to preserve the balance.

In the accompanying drawing is shown one of the numerous forms of apparatus which may be employed in performing my process.

Figure 1 is a vertical section view of the said apparatus, and Fig. 2 is a transverse vertical section view taken on the line A A of Fig. 1.

In these drawings, 1 indicates a receptacle or chamber which may have metallic walls 2, 2, except on that side which is traversed by the conduits for the cooling gas, where a wall 3 of marble or some suitable non-conducting material is employed. The chamber thus formed by the metallic wall 2 and insulating wall 3 is inclosed by a suitable jacket 4 of cork or other non-conductor of heat, in order to render the process independent of the temperature of the surrounding atmosphere. The gas to be ozonized enters the aforesaid chamber at the bottom through the inlet pipe 7 and the ozone is discharged therefrom at the upper end through the outlet pipe 8, although the direction may be reversed in some cases to advantage because of the ozone being heavier than gas from which it is derived.

The electrodes contained in the aforesaid chamber 1 are marked 9 and are shown as three in number, the central one being connected to one terminal and the other two to the opposite terminal of the circuit. One terminal of the circuit is also grounded as a matter of convenience, in order to avoid the need of insulation on that side of the circuit. These electrodes 9 are flat in form and are each composed of a sinuous tube, the bends of the tubes lying in a vertical plane, and between the successive loops of the tubes are interposed corrugated plates 24, which form a radiating surface. The dielectric plates or partitions 25, preferably of glass, are interposed between the electrodes, while the tubular portions of the electrodes are slightly elevated above the corrugated radiating plates 24, so that the electrical discharge occurs at the raised tubular portions and not at the radiating portions of the electrodes. The dielectric plates 25 are not attached to the walls of the chamber at the top and bottom, so that the free passage of the gas to be ozonized is permitted on both sides thereof between the said plates and the electrode surfaces parallel thereto.

The cooling liquefied gas is introduced into the aforesaid hollow electrodes, and, as it expands, circulates along the sinuous path formed by the tubular electrodes, chilling both the discharge portion and the radiating portion thereof. Into the grounded electrodes the cooling gas is introduced by the pipe 32 and withdrawn therefrom by the pipe 33. Into the non-grounded electrode the cooling gas is introduced by the pipe 30 and withdrawn by the pipe 31, the electrodes being insulated, by the tubular insulators 14 and 15, from the remainder of the pipe system. Thus in the supply pipe the tubular insulator 14 is inserted as a section of said pipe, being connected at its lower end to the inlet pipe 30, while similarly the outlet pipe 31 is continued by the tubular insulator 15 and the pipe leading therefrom. In the inlet pipe leading to the insulated electrode is placed the regulating and controlling valve 21, while below it in the same pipe is a rotary valve 20 which serves to interrupt the continuous flow of the liquefied gas and permit to fall in drops through the insulator 14 into the inlet pipe 30. By this means the insulation of the non-grounded electrode is maintained, there being no chance for the electricity to escape through a stream of liquefied gas acting as a conductor. For the grounded electrode a controlling valve will be provided but the interrupter valve is not required.

The electrical energy, preferably of the alternating form, is provided by a transformer 12, its secondary leads 11 being connected respectively to the central electrode on the one hand and the two grounded electrodes on the other hand.

In operation the gas to be ozonized is admitted to the chamber through the inlet pipe 7 and passes upward through the ozonizing chamber at a practically constant velocity, the cross section of the gas column being practically uniform, so that the aforesaid condition of balance between the generation and abstraction of heat is maintained at all points from end to end of the ozonizing chamber. The gas to be ozonized as it enters the chamber passes first over the surface of the tubular raised portions of the electrodes between which the electrical discharge is taking place and is thereby subjected to the ozonizing action which produces a certain increment of heat, and then it immediately passes over the cooling surfaces of the adjacent set of corrugated plates 25 where the heat generated by the previous ozonizing action is immediately abstracted, there being, of course, no marked increase in temperature but simply a tendency to an increase of temperature at the ozonizing point and a counterbalancing cooling tendency at the cooling point which counteracts the heating tendency, so that the gas arrives at the next ozonizing point at the same low temperature at which it entered the chamber. This effect is continued throughout the entire length of the chamber, there being a proper proportioning of the cooling effect with respect to the heating effect at each division of the electrodes. The gas to be ozonized is preferably dried before its admission to the chamber in any suitable manner, as by passing the same through a freezing chamber to dry it, which also reduces it to the required low initial temperature. The heat is transferred not only by conduction, but also by radiation, while the forward flow of the gas also serves to distribute the cooling action and maintain the constancy of temperature throughout the ozonizing chamber. I therefore maintain the constancy of temperature in the gas, in the electrodes and in the dielectric, which is a triple cooling effect of much value. I am also independent of the ratio of air-flow and can make it as low as desired, and the velocity of the gas being low, very high concentrations become possible and the maintenance of the low temperature permits the effective production of ozone at all points in the chamber, it having been found that there is a definite relation between the temperature and pressure, of the gas being treated, when the concentration or the production of ozone is at a maximum for any given temperature or pressure. This relation or balance is made possible by the fact that the increments of ozonizing effects are retained while the increments of heating effect are removed. The uniformity of temperature throughout the chamber also has the effect of preserving a uniformly low temperature of the dielectric partitions which are usually of glass and liable to be broken by internal strains when unevenly heated and cooled.

Having thus described one form of my improved process, what I claim and desire to secure by Letters Patent is:

1. The process of producing ozone which comprises progressively ozonizing a suitable gas and during the submission of the gas to the ozonizing action, correspondingly and continually abstracting the increments of heat produced.

2. The process of producing ozone which comprises passing the gas therefor through silent or streaming discharges and during the ozonizing action maintaining the said gas at a substantially uniform temperature.

3. The process of producing ozone which comprises passing the gas therefor through silent or streaming discharges and during the ozonizing action maintaining the said gas at a substantially uniform temperature by causing successive cooling actions.

4. The process of producing ozone which comprises passing the gas therefor through silent or streaming discharges and during the ozonizing action balancing, step by step, the increments of heat produced, by corresponding increments of cooling actions.

5. The process of producing ozone which comprises, submitting the gas being treated to a succession of silent or streaming discharges at a substantially uniform rate and during the ozonizing action maintaining, through the action of a continuously-acting cooling medium, a balance, for any given pressure, between the heat generated by the discharges and the heat abstracted so that the temperature remains constant, said temperature being the temperature of chemical equilibrium of the discharged gas.

6. A process for producing ozone which consists in submitting the gas to a series of independent electrical discharges and during the ozonization maintaining the temperature of the gas substantially constant, the constancy of this temperature giving the highest production of ozone by virtue of the resulting chemical equilibrium for such temperature, the constancy of temperature being maintained by the action of an expanding liquefied gas.

7. A process for the formation of ozone, comprising subjecting a column of the treated gas, substantially uniform in cross section, to a series of bands of streaming discharges and at the same time cooling said gas between each successive band of discharge.

8. A process for the formation of ozone, comprising subjecting the gas to be transformed to a series of successive bands of streaming discharges and at the same time cooling said gas between each successive band of discharge, the velocity and cross section of the path of flow of the gas being maintained substantially constant during treatment.

9. A process for the formation of ozone, comprising subjecting the gas to be transformed to streaming discharges, at the same time cooling said gas and absorbing all heat incident upon said discharges through the action of an expanding or evaporating liquefied gas.

10. A process for the formation of ozone, comprising subjecting the gas to be transformed to streaming discharges, said discharges and gas being maintained interactive upon each other in the presence of the cooling effect of an expanding or evaporating liquefied gas sufficient to absorb all the heat developed.

11. A process for the formation of ozone, comprising subjecting the gas to be transformed to a series of successive bands of streaming discharges in the ozonizing chamber and at the same time cooling said gas between each successive band of discharge in the ozonizing chamber by the action of an expanding or evaporating liquefied gas.

12. A process for the formation of ozone, comprising subjecting the gas to be transformed to a series of successive bands of streaming discharges and at the same time cooling said gas in and between each successive band of discharge by the action of an expanding or evaporating liquefied gas.

13. A process for the formation of ozone, comprising the steps of dividing liquefied gas into separate insulated bodies, expanding the same, and at the same time subjecting a uniform column of the gas to be transformed to a series of successive bands of streaming discharges under the cooling effect of said expanding liquefied gas between its passages through each successive band or discharge and reliquefying the expanded gas.

14. A process for the formation of ozone, comprising the steps of dividing the liquefied gas into separate insulated bodies, expanding the same, and at the same time subjecting a uniform column of the gas to be transformed to a series of successive bands of streaming discharges under the cooling effect of said expanding liquefied gas during and between its passages through each successive band of discharge and reliquefying the expanded gas.

Signed at the city of New York, in the State of New York, this 1st day of September, 1908.

JAN STEYNIS.

Witnesses:
EDWARD W. VAILL, Jr.,
JAMES J. COSGROVE.